(12) United States Patent  
Uchida

(10) Patent No.: US 8,614,814 B2  
(45) Date of Patent: Dec. 24, 2013

(54) IMAGE PROCESSING APPARATUS FOR CONTROLLING PLURAL IMAGE OUTPUTTING PARTS

(75) Inventor: Fukutoshi Uchida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 821 days.

(21) Appl. No.: 12/493,507

(22) Filed: Jun. 29, 2009

(65) Prior Publication Data

US 2010/0007927 A1   Jan. 14, 2010

(30) Foreign Application Priority Data

Jul. 14, 2008   (JP) ................... 2008-182906

(51) Int. Cl.  
*G06F 3/12* (2006.01)  
*G06F 15/00* (2006.01)  
*G06K 15/02* (2006.01)

(52) U.S. Cl.  
USPC ........................... 358/1.15; 358/1.13; 358/1.9

(58) Field of Classification Search  
None  
See application file for complete search history.

(56) References Cited

U.S. PATENT DOCUMENTS

| 2001/0021979 A1* | 9/2001 | Ito .................................. 713/189 |
| 2002/0054326 A1 | 5/2002 | Morita |
| 2002/0131064 A1* | 9/2002 | Maeda et al. ................. 358/1.13 |
| 2002/0145752 A1* | 10/2002 | Hanabusa et al. ............ 358/1.15 |
| 2002/0159087 A1 | 10/2002 | Yoshida et al. |
| 2004/0125415 A1 | 7/2004 | Michiie et al. |
| 2005/0100378 A1* | 5/2005 | Kimura et al. .................. 400/76 |
| 2006/0072152 A1* | 4/2006 | Krykun et al. ............... 358/1.15 |
| 2006/0268332 A1* | 11/2006 | Shimada ....................... 358/1.15 |
| 2007/0188824 A1* | 8/2007 | Imamichi ...................... 358/448 |
| 2008/0027569 A1* | 1/2008 | Okigami ......................... 700/83 |
| 2008/0068657 A1 | 3/2008 | Uchida et al. |

FOREIGN PATENT DOCUMENTS

| JP | 07-175916 | 7/1995 |
| JP | 10-074163 | 3/1998 |
| JP | 11-165453 | 6/1999 |
| JP | 2002-084383 | 3/2002 |
| JP | 2004-106428 | 4/2004 |

OTHER PUBLICATIONS

Japanese Office Action dated Jul. 31, 2012.

* cited by examiner

*Primary Examiner* — Ming Hon  
(74) *Attorney, Agent, or Firm* — IPUSA, PLLC

(57) ABSTRACT

An image processing apparatus includes plural image outputting parts, an image processing part configured to process image data to be output by the plural image outputting parts, plural software control parts configured to selectively control the plural image outputting parts, a user service selecting part configured to share the image processing part in a case of processing the image data to be output from the plural image outputting parts and select plural user services that selectively use the plural software control parts, and a request executing part configured to sequentially receive plural image process requests and plural output requests from the plural software control parts and execute the plural image process requests and the plural image output requests in an order in which the plural image process requests and the plural output requests are sequentially received.

9 Claims, 16 Drawing Sheets

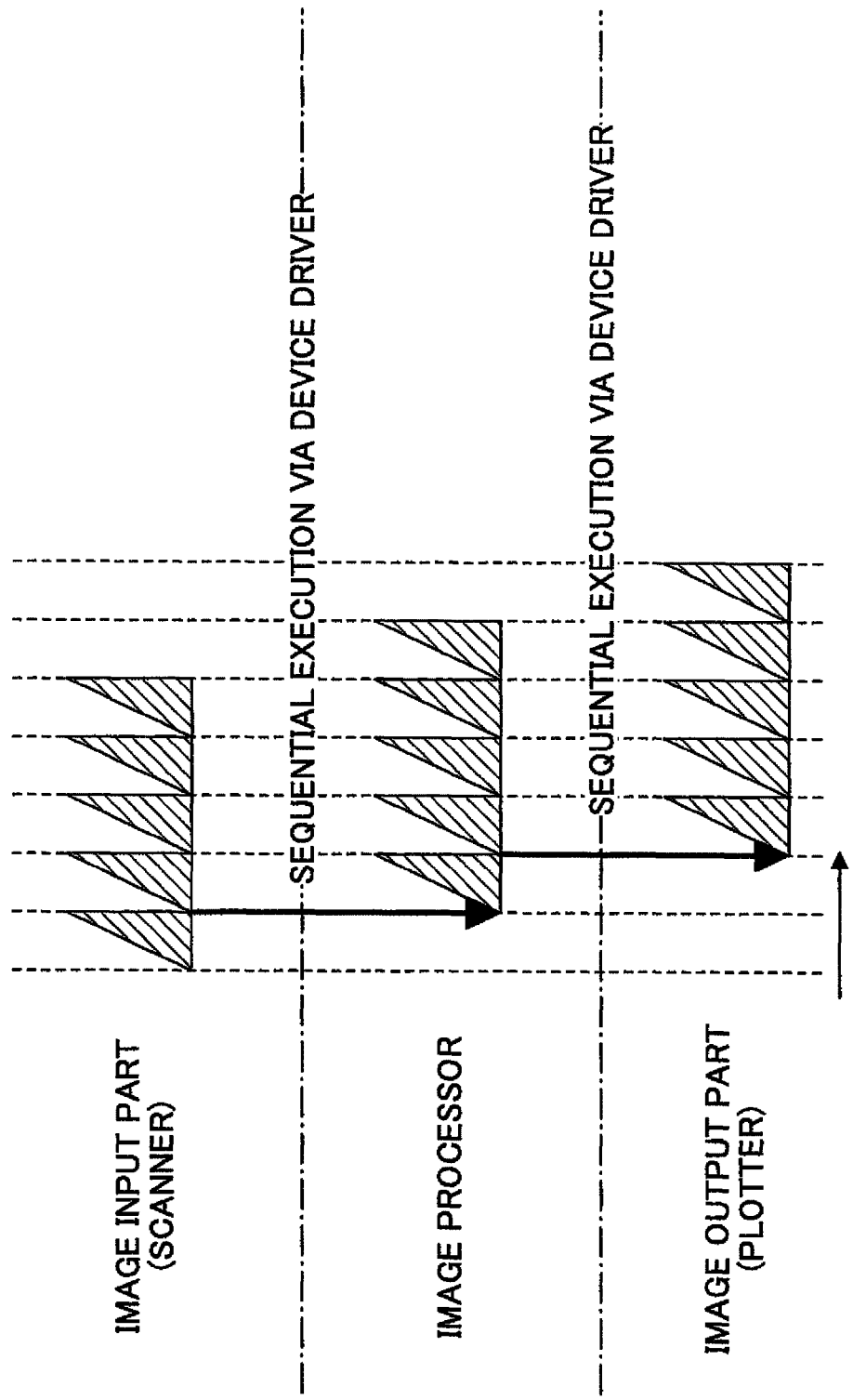

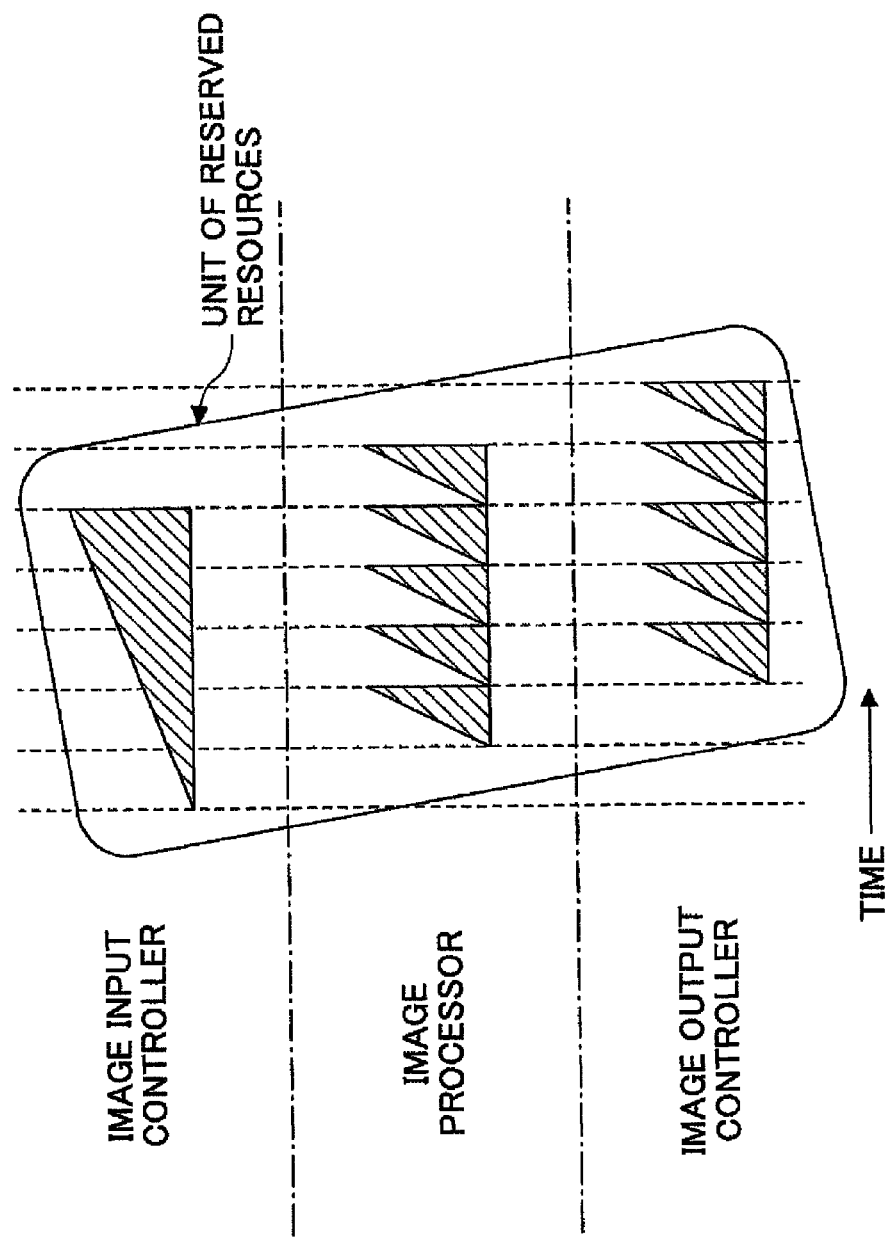

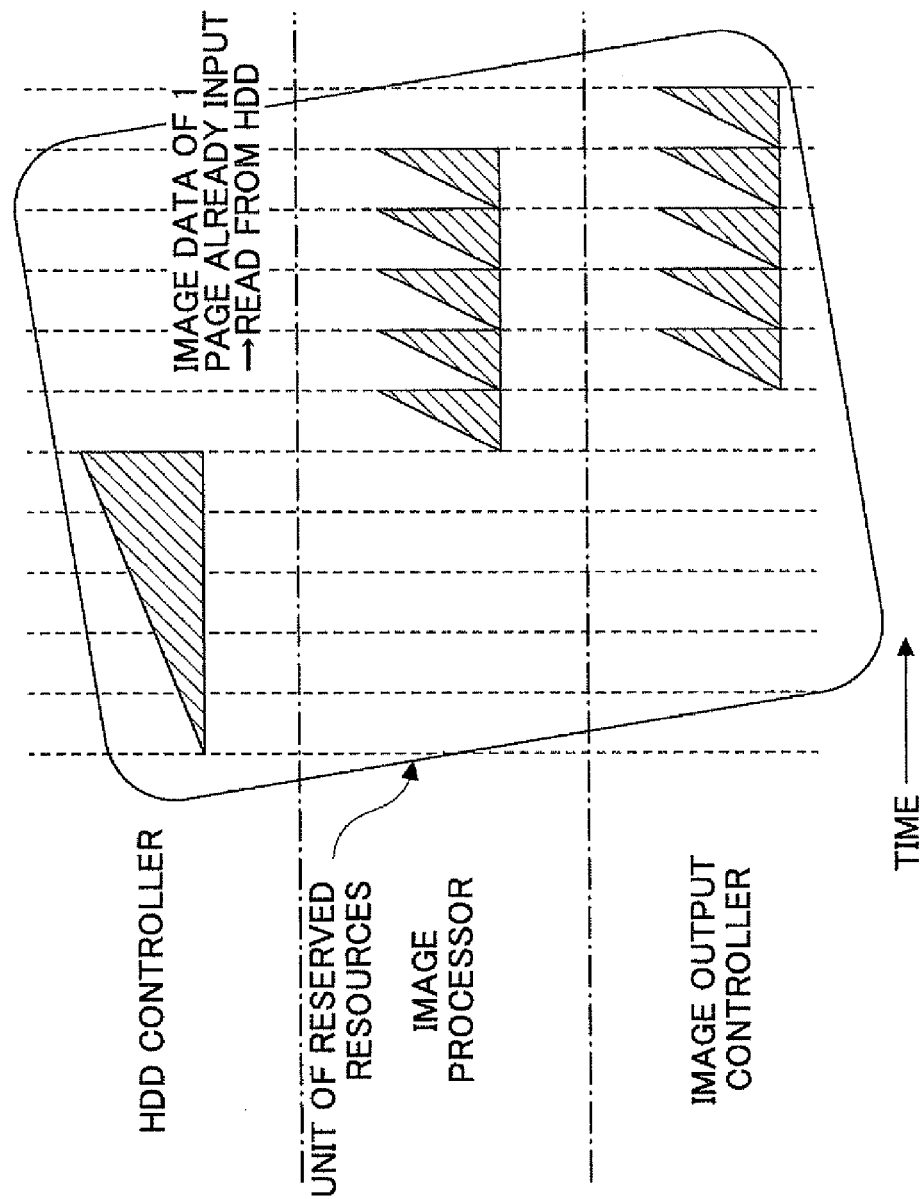

IMAGE PROCESSING APPARATUS FOR CONTROLLING PLURAL IMAGE OUTPUTTING PARTS

BACKGROUND OF THE INVENTION

1. Field of the Invention

The present invention relates to an image processing apparatus.

2. Description of the Related Art

With recent digital multifunction machines (hereinafter also referred to as "MFP (Multi-Function Printer)"), the MFPs are desired to simultaneously handle plural input/output application programs (hereinafter also referred to as "application" or simply "appli"). For example, the MFP, in accordance with the commands from each application, prints (outputs) image data scanned (input) from a scanner onto a printing medium (e.g., paper) while transmitting the scanned image data via facsimile. In another example, the MFP may print the image data while transmitting the image data via a network (e.g., e-mail transmission).

There is also a desire for a controller platform that can be customized with respect to plural applications (e.g., addition/deletion/change of application).

In order to establish such a controller platform that assures, for example, replacement of applications in application units, a common image processing path is to be provided in a system.

In a related art example, image processing (e.g., an image processing method) relying on plural applications (i.e. processing of image data) or an image converting method (i.e. changing the format of image data) is performed by an executing part dedicated to each application.

Accordingly, Japanese Laid-Open Patent Publication No. 10-074163 discloses a configuration that performs management by sharing resources with respect to a memory unit.

With this configuration, a control part is also required to be shared in a system and be independent from applications in order to perform addition/deletion/changing of applications in application units. Otherwise, programming for image processing would also have to be performed in order to customize a platform with respect to the application. Further, the platform would be difficult to handle since controls relying on hardware are needed to be customized.

SUMMARY OF THE INVENTION

The present invention may provide an image processing apparatus that substantially eliminates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image processing apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image processing apparatus including plural image outputting parts, an image processing part configured to process image data to be output by the plural image outputting parts, plural software control parts configured to selectively control the plural image outputting parts, a user service selecting part configured to share the image processing part in a case of processing the image data to be output from the plural image outputting parts and select plural user services that selectively use the plural software control parts, and a request executing part configured to sequentially receive a plurality of image process requests and a plurality of output requests from the plural software control parts and execute the plural image process requests and the plural image output requests in an order in which the plural image process requests and the plural output requests are sequentially received.

Other objects, features and advantages of the present invention will become more apparent from the following detailed description when read in conjunction with the accompanying drawings.

BRIEF DESCRIPTION OF THE DRAWINGS

FIG. 7 is a schematic diagram for describing an operation where image data are transferred from a scanner to an image processing part, and then from the image processing part to a plotter according to an embodiment of the present invention;

FIGS. 8A and 8B are schematic diagrams for describing an operation of reserving resources in a case of scanning image data of a single page with a scanner and printing the image data of a single page with a plotter according to an embodiment of the present invention;

DETAILED DESCRIPTION OF THE PREFERRED EMBODIMENTS

In the following, embodiments of the present invention will be described with reference to the accompanying drawings. An MFP (image forming apparatus) is described below as an example of an image processing apparatus according to an embodiment of the present invention.

[Configuration of MFP]

An exemplary configuration is described with reference to FIG. 1.

Figure 1:
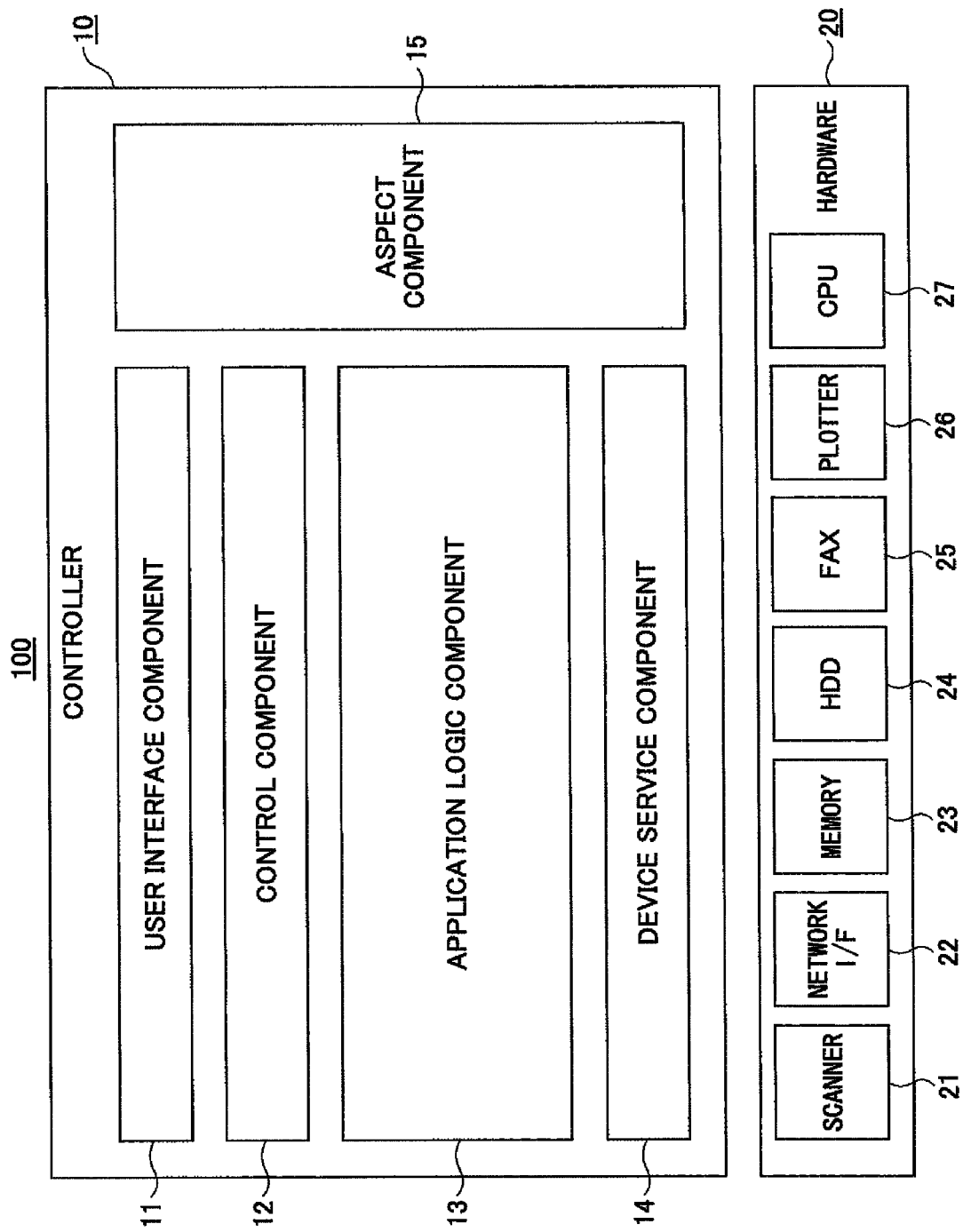
FIG. 1 is a block diagram illustrating a configuration of an MFP according to an embodiment of the present invention.

FIG. 1 is a block diagram illustrating a configuration (hardware and architecture) of an MFP 100 according to an embodiment of the present invention.

The MFP 100 includes a controller section 10 and a hardware section 20.

The controller 10 includes software (programs) such as a user interface component 11, a control component 12, an application logic component 13, a device service component 14, and an aspect component 15. Although processes of programs (components) are actually ultimately executed by a CPU (Central Processing Unit) 27, this embodiment describes the processes being executed by the programs for the sake of convenience.

The hardware section 20 includes, for example, a scanner 21, a network interface (I/F) 22, a memory 23, a HDD (hard disk drive) 24, a facsimile (FAX) 25, and a plotter 26.

The user interface component 11 is for accepting requests (hereinafter also referred to as "user request") to execute a service (user service) from a user or service user and transferring requests to the control component 12. The user service includes, for example, a copier service, a facsimile service, a printer service, a storage service, or a multi-service including a combination of these services.

The control component 12 determines the combination of functions provided by the application logic component 13 and controls the combination of functions so that the user request from the user interface component 11 can be achieved. For example, in a case of receiving a copy request, the control component 12 determines that a combination of a scanning function and a printing function be used for the copy request and controls the combination of functions for achieving a copying process. Accordingly, the below-described scanner 21 obtains image data of a document by scanning the document and the plotter 26 outputs (prints) the image data on a printing medium (e.g., paper).

The application logic component 13 includes a group of functions provided by the MFP 100.

The device service component 14 includes device resources that are shared with the application logic component 13.

The aspect component 15 handles logic (e.g., access control, history, billing) that transversely affects the above-described components (sub-components).

The scanner 21 includes an image reading part that obtains image data by scanning, for example, a document.

The network I/F 22 includes a communicating apparatus that communicates with an opponent via a network (e.g., Ethernet (registered trademark), wireless LAN (Local Area Network). The network I/F 22 also functions as an image input part and an image output part.

The memory 23 includes a storage part such as a RAM (Random Access Memory) or a ROM (Read Only Memory) for reading/writing programs and various data. The memory 23 functions as an image storage part.

The HDD 24 stores programs and various data (e.g., image data). The HDD 24 also functions as the image storage part.

The facsimile (FAX) 25 functions as a data transmission/reception part that transmits/receives data by using a public switched network (telephone line). The facsimile 25 also functions as an image input part and an image output part.

The plotter 26 functions as an image output part that outputs (prints) image data on a printing medium (e.g., paper).

[Configuration of Application Logic Component]

Next, an exemplary configuration of the application logic component 13 is described with reference to FIGS. 2, 3A, and 3B.

Figure 2:
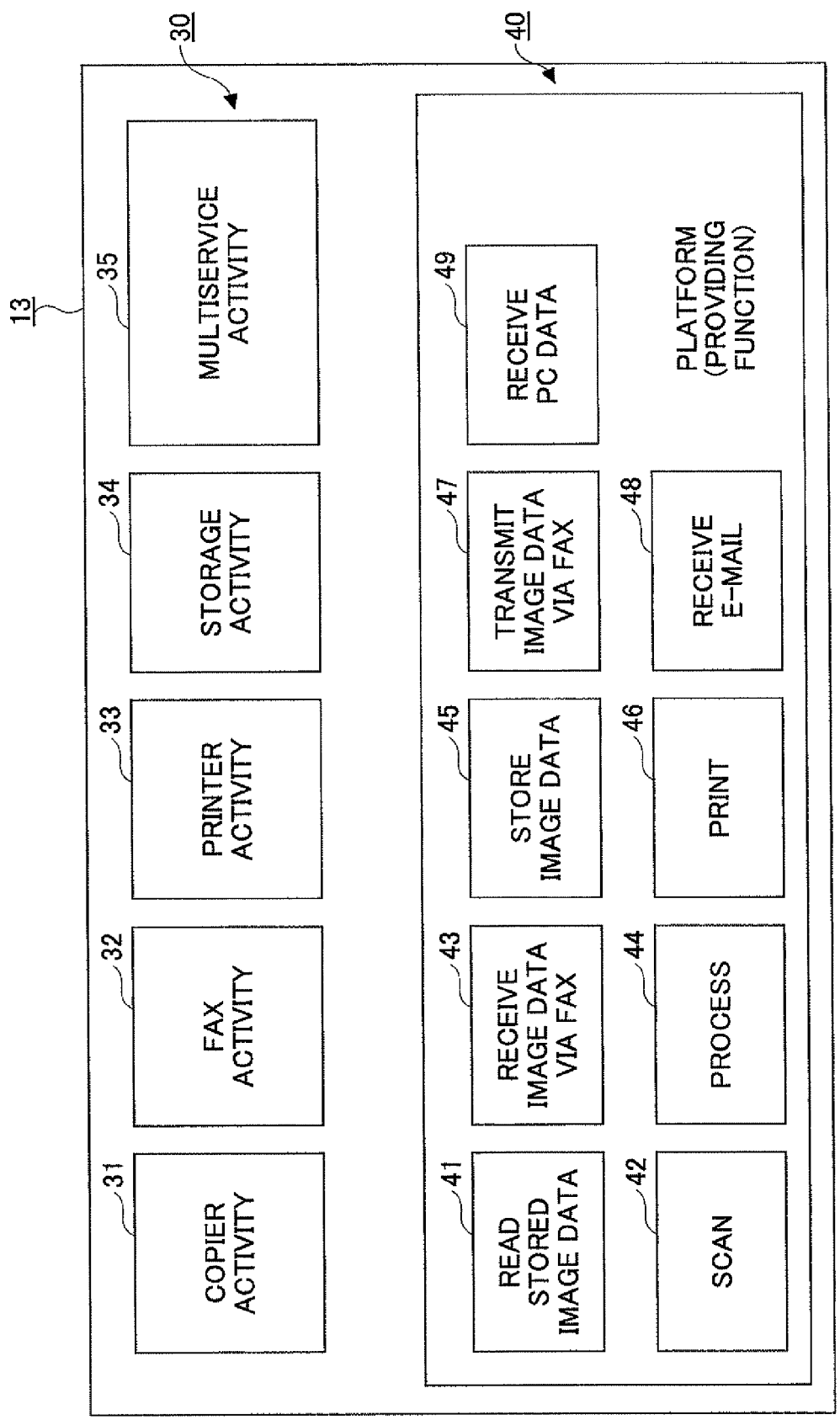
FIG. 2 is a block diagram illustrating an exemplary configuration of an application logic component according to an embodiment of the present invention.

FIG. 2 is a block diagram illustrating the exemplary configuration of the application logic component 13.

Figure 3A:
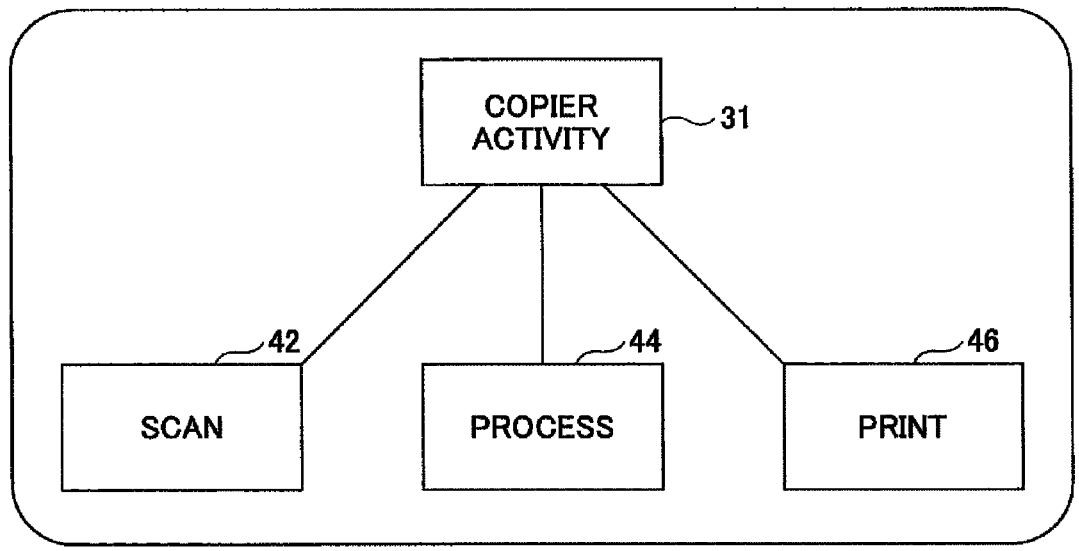
FIGS. 3A and 3B are schematic diagrams for describing a method of establishing an application with an application logic component according to an embodiment of the present invention.
Figure 3B:
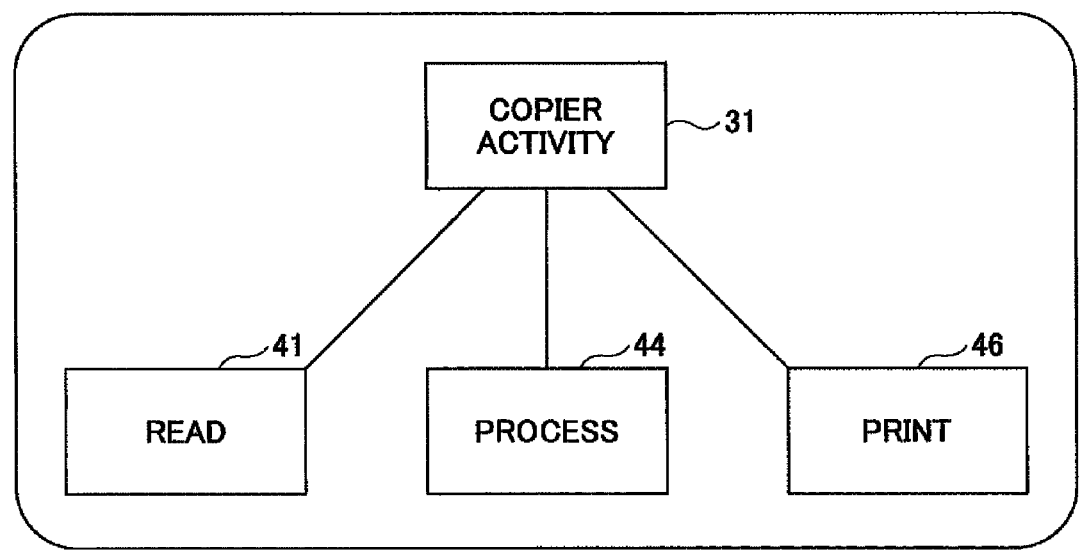

FIGS. 3A and 3B are schematic diagrams for describing a method of establishing an application with the application logic component 13.

The application logic component 13 includes an activity part 30 and a providing function part 40.

The activity part 30 achieves a single user request by combining each one of input components, process components, and output components provided by a system of the MFP 100 for inputting/processing/outputting image data. The activity part 34 includes a copier activity 31, a facsimile activity 32, a printer activity 33, a storage activity 34, and a multi-service activity 35. In this embodiment, the term "process" includes various image processes such as an image editing process and an image conversion process.

The providing function part 40 includes a group of input functions, process functions, and output functions provided by the system of the MFP 100 for establishing various applications according to the activities 31-35 of the activity part 30. For example, the providing function part 40 includes a stored data (e.g., document data) reading function 41 (hereinafter also referred to as "reading function 41"), a scanning function 42, a facsimile receiving function 43, a processing function 44, a data (e.g., document data) storing function 45, a printing function 46, a facsimile transmitting function 47, an electronic mail receiving function 48, and a PC (personal computer) data receiving function 49.

The copier activity 31 establishes a copier application for providing a copier service by combining the printing function 46 with the reading function 41 or the scanning function 42.

The facsimile activity 32 establishes a facsimile application for providing a facsimile service by combining the printing function or the facsimile transmitting function 47 to the facsimile receiving function 43.

The printer activity 33 establishes a printer application for providing a printer service by combining the printing function 46 with the PC data receiving function 49.

The storage activity 34 establishes a storage application for providing a storage service by combining the data storing function 45 with the facsimile receiving function 43, the PC receiving function 49, the reading function 42, or the electronic mail receiving function 49.

The multi-service activity 35 establishes a multi-service application for providing multiple services by discretionally combining at least one of the inputting functions including the facsimile receiving function 43, the PC data receiving function 49, the reading function 42, or the electronic mail receiving function 48 with at least one the outputting functions including the data storing function 45, the printing function 46, and the facsimile transmitting function 47.

The applications established by the corresponding activities 31, 32, 33, 34, 35 each function as a software control part.

The reading function 41 is a function for reading image data (e.g., document data) stored in the HDD 24.

The scanning function 42 is a function for scanning image data on a document via the scanner 21.

The facsimile receiving 43 is a function for receiving image data transmitted from outside the MFP 100 via the facsimile 25.

The processing function 44 is a function for performing processing (image processing) on image data by using the below-described image processing part 53.

The data storing function 45 is a function for storing input image data in the HDD 24.

The printing function 46 is a function for printing input image data to a printing medium via the plotter 26.

The facsimile transmitting function 47 is a function for transmitting input image data to the outside via the facsimile 25.

The electronic mail receiving function 48 is a function for receiving electronic mail transmitted from outside the MFP 100 via the network I/F 22.

The PC data receiving function 49 is a function for receiving data transmitted from a PC outside the MFP 100 via the network I/F 22.

The activity part 34 may also include an electronic mail activity. The electronic mail activity may serve as a mail application by combining a mail transmitting function with the reading function 42 or the storing function 41.

Each of the above-described activities may also use the processing function 44.

For example, as illustrated in FIG. 3A, the copier activity 31 establishes a copier application by combining the processing function 44 and the printing function 46 with the scanning function 42. In this case, image data of a document is scanned (obtained) by the scanner 21, the scanned image data are processed by the processing function 44, and the processed image data are printed (output) onto a printing medium by the plotter 26.

As illustrated in FIG. 3B, the copier activity 31 may also serve as a copier application by combining the processing function 44 and the printing function 46 with the data reading function 41. In this case, image data of a document (document data) stored in the HDD 24 are read out, the read image data are processed by the processing function 44, and the processed image data are printed (output) onto a printing medium by the plotter 26.

[Hardware Configuration of Controller]

Next, a control part of the controller section 10 and a physical configuration of the hardware section 20 are described with reference to FIG. 4.

In this embodiment, the MFP 100 can use various applications for a copier, a facsimile, a printer, a scanner, and electronic mail. Further, input (obtaining) of image data or output of image data can be selected. A memory (corresponding to space where image data are processed in the memory 23) may be assigned to each application. However, considering the aspect of cost, the memory may be shared by all applications, so that a memory is used for each application according to necessity.

Figure 4:
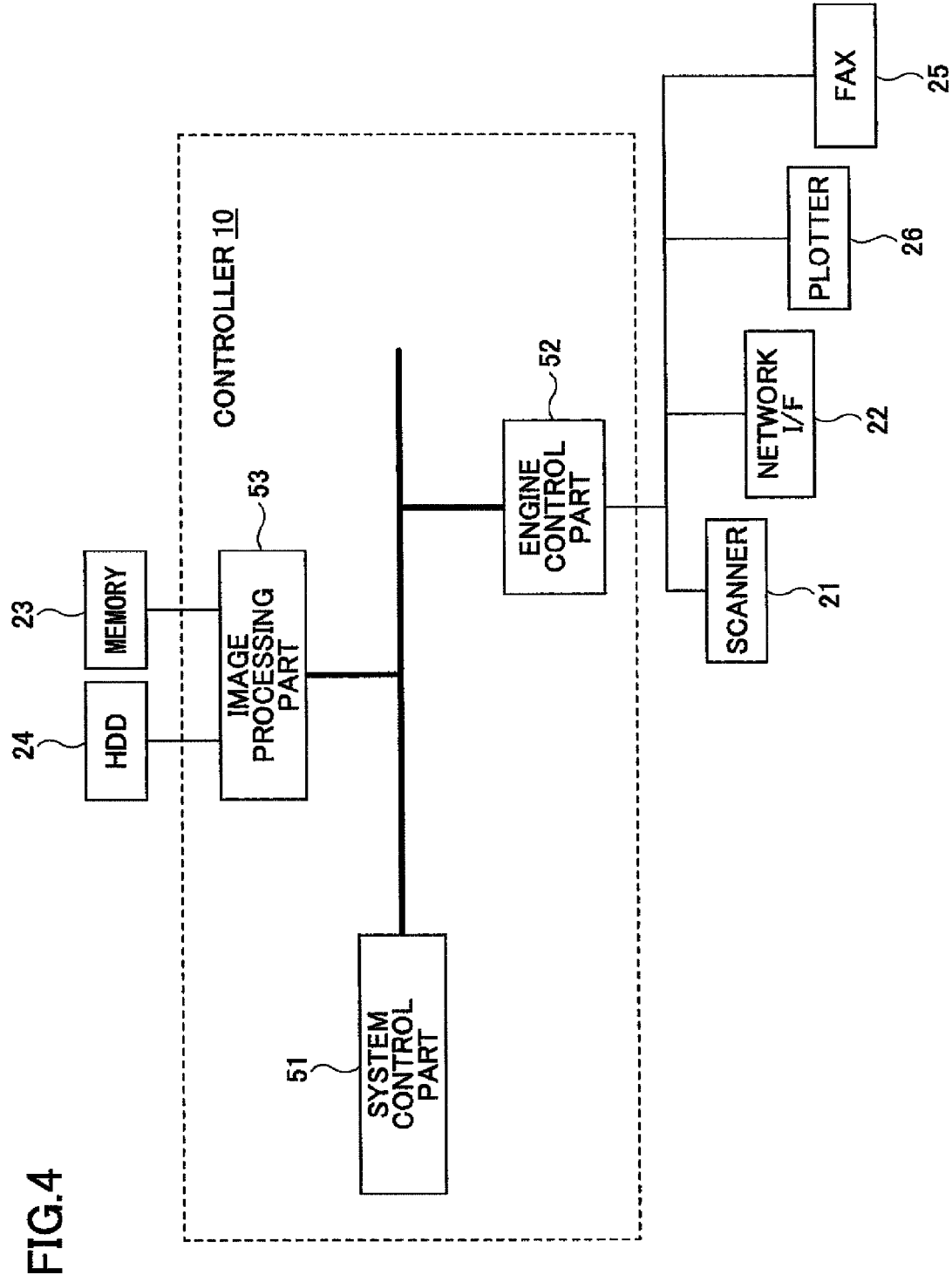
FIG. 4 is a block diagram illustrating a physical configuration of a controller section and a hardware section according to an embodiment of the present invention.

FIG. 4 is a block diagram illustrating a physical configuration of the controller section 10 and the hardware section 20.

The controller section 10 includes a system control part 51, an engine control part 52, and an image processing part 53.

The system control part 51 uses a microcomputer including at least the CPU 27, a ROM (not illustrated), and a RAM (not illustrated). Accordingly, the CPU 27 executes programs read from the ROM and data from the HDD 24, to thereby control the entire MFP 100. The system control part 51 functions as a user-service selecting part, a request executing part, and a condition setting part by executing, for example, the copier activities 31 illustrated in FIGS. 3A and 3B.

The system control part 51 is connected to the scanner 21, the network I/F 22, the plotter 26, and the facsimile 25 of the hardware section 20 via the engine control part 52.

The engine control part 52 controls the scanner 21, the network I/F 22, the plotter 26, and the facsimile 25 according to instructions from the system control part 51. The engine control part 52 also functions as an image transfer control part.

The system control part 51 is also connected to the image processing part 53 which controls the memory 23 and the HDD 24. Accordingly, the system control part 51 can control a process in which the image processing part 53 writes (inputs) image data obtained from the engine control part 52 to the memory 23 or the HDD 24 or a process in which the image processing part 53 outputs image data read from the memory 23 or the HDD 24 to the engine control part 52.

The image processing part 53 controls the memory 23 and the HOD 24 according to instructions from the system control part 51. The image processing part 53 performs image processing on the input image data according to necessity. The image processing part 53 functions as an image processor. In addition, the image processing part 53 may also function as an image input/output control part.

[Operation of Controller Section]

Figure 5:
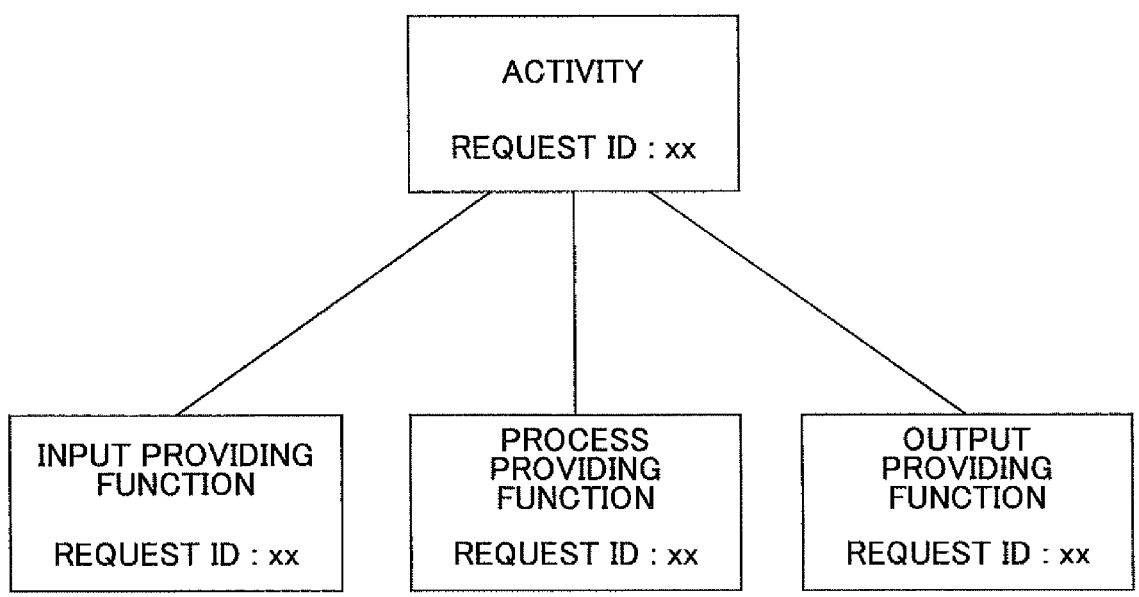
FIG. 5 is a schematic diagram for describing an example of a request ID assigned to an input providing function, a process providing function, an output providing function of a providing function part by an activity part according to an embodiment of the present invention.

Next, various operations of the controller section 10 are described with reference to FIG. 5 in a case where an application issues requests to perform image inputting (inputting of image data), image processing (processing of image data), and image outputting (outputting of image data). Although image data may be input from the scanner 21, the network I/F 22, or the facsimile 25, this embodiment describes image data input from the scanner 21.

(1) OVERALL OPERATION

In a case where plural applications (e.g., copier application, facsimile application) for reading (inputting), processing, printing (outputting) image data are used to execute an image inputting process, an image processing process, and an image outputting process, each application of the plural applications issues a request to the engine control part 52. The request issued to the engine control part 52 indicates a request ID identifying each application, the page number of the image data to be input/output, and conditions for inputting/processing/outputting the image data. As illustrated in FIG. 5, the same request ID is assigned to an activity corresponding to the application and to the input providing function, the process providing function, and the output providing function used for executing the application.

Each of the providing functions may be provided as a part of the system control part 51, and the providing functions as a whole may be regarded as the system control part 51.

When the engine control part 52 receives a printing request (e.g., a combination of an image input request and an image output request) from the system control part 51, the engine control part 52 issues an image input request to the scanner 21 and an image output request to the plotter 26. In a case where the engine control part 52 receives responses corresponding to the requests, the engine control part 52 issues a corresponding request to the image processing part 53 together with an image ID (request ID and page number of image data) and conditions regarding image input (image input conditions) and conditions regarding image output (image output conditions). The system control part 51 directly issues an image process request to the image processing part 53 together with conditions regarding image processing (image processing conditions).

The image processing part 53 receiving the requests allocates (inputs) image data to an available space in the memory 23. In allocating the image data, the image processing part 53 compares the memory space required for inputting the requested image (memory space required for allocating all the image data) and the available memory space of the memory 23 and determines whether the memory space required for inputting the requested image is no greater than the available memory space of the memory 23.

In a case where the memory space required for inputting the requested image is greater than the available memory space of the memory 23, the image processing part 53 determines that data cannot be input to the available memory because all of the image data to be input cannot be allocated to the memory 23. Accordingly, the image processing part 53 reports the determination result to the system control part. Accordingly, image data is not allocated to the memory 23.

In a case where the memory space required for inputting the requested image is no greater than the available memory space of the memory 23, the image processing part 53 determines that data can be input to the available memory space because all of the image data to be input can be allocated to the memory 23. Accordingly, image data to be input are successively allocated to a predetermined available space of the memory 23 from the scanner 21 via the engine control part 52. Thus, image data corresponding to input image areas (length in main scanning direction, length in sub-scanning direction) are allocated to the available memory space.

The image data allocated in the memory 23 includes image data input from the scanner 21 via the engine control part 52, image data processed by the image processing part 53, and image data to be output by the plotter 26. In some cases, however, image data processed by the image processing part 53 does not need to be allocated to the memory 23 but directly sent to the plotter 26. For example, in a case where image data processed by the image processing part 23 are substantially the same as the image data to be output by the plotter 26, the processed image data may be sent as is to the plotter 26 without having to be sent to the memory space.

After the image data input from the scanner 21 via the engine control part 52 are all allocated to the memory 23, the image processing part 53 performs image processing on the image data. Then, the processed image data is sent to the plotter 26 via the engine control part 52.

Figure 6:
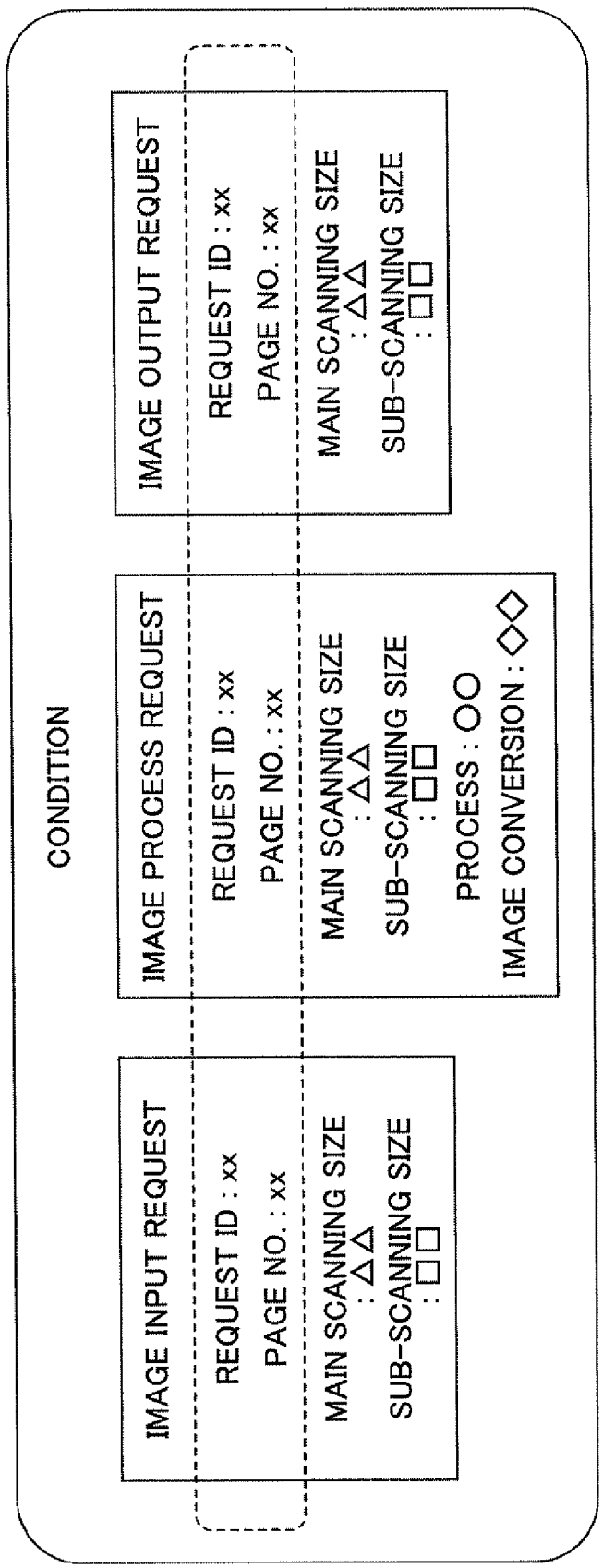
FIG. 6 is a schematic diagram illustrating conditions of an image input request, an image process request, an image output request (including image IDs) issued from a providing function part according to an embodiment of the present invention.

As illustrated in FIGS. 6 and 7, the above-described image inputting process, image processing process, and the image outputting process are achieved by assuming that the image input request, the image process request, and the image output request are a series operations corresponding to the same image ID (request ID and page number of image data) and setting the operations to the engine control part (device driver) 52 and the image processing part 53.

(2) ARBITRATION OF RESOURCES

In a case where the image processing part 53 receives requests corresponding to the same resource, the image processing part 53 reserves resources (allocates resources) with respect to all of the requests (a series of requests) having the same image ID. In a case where the image processing part 53 is able to reserve enough resources, the image processing part 53 reports to the system control part 51 that the reserving of resources is completed (reservation completion report).

In a case where the resources cannot be reserved, the image processing part 53 queues the series of requests (i.e. sequentially stacks the series of requests in a FIFO manner). Then, the image processing part 53 determines whether the resources have become available. When the resources become available, the image processing part 53 reserves the resources and reports the completion of reserving the resources to the system control part 51.

In this embodiment, the resources include the engine control part 52, the scanner 21, the network I/F 22, the memory 23, the HOD 24, the facsimile 25, and the plotter 26.

The resources are sharable resources of the system control part 51. The system control part 51 manages the sharable resources based on the reservation completion report from the image processing part 53. The system control part 51 may function as an arbitrating part that arbitrates the sharable resources when using the sharable resources for plural applications at the same time or when using the same sharable resources for plural applications.

(3) PROCESS UNIT OF IMAGE DATA

In a case of a printing process (outputting image data from the plotter 26), the unit of a printing process is one page. Accordingly, the engine control part 52 and the image processing part 53 may perform operations where image data are transferred in page units. In a case where image data of a page is divided into further units (e.g., in this embodiment, these units are referred to as "bands"), image data are transferred in band units. Accordingly, a printing process starts when the engine control part 52 receives the first band of image data from the image processing part 53. The divided image data are sequentially sent from the scanner (image input part) 21 to the plotter (image output part) 26 without any intervals of time (See FIG. 7).

As illustrated in FIG. 7, based on the band units, the start of the image inputting process by the engine control part 52 is the trigger for causing the image processing part 53 to start an image processing process, and the start of the image processing process by the image processing part 53 is the trigger for causing the engine control part 52 to start an image outputting process. Accordingly, the image inputting process, the image processing process, and the image outputting process are sequentially started in parallel.

The trigger for starting a process (i.e. data indicating which band ($n^{th}$ band) a process should be started) is included in the conditions of an issued request. Once the conditions are set to the engine control part 52 (device driver) and the image processing part 53 prior to performing the image inputting process, the image processing process, and the image outputting processes, the processes can be started. By performing the image inputting process, the image processing process, and the image outputting processes in parallel in the above-described manner, productivity (in this example, a printing process) can be improved compared to processing in page units.

The image inputting process, the image processing process, and the image outputting process can be performed as a set of processes in parallel when corresponding requests are received and necessary resources are reserved at the time of starting the image inputting process, the image processing process, and the image outputting process. Otherwise, in a case where corresponding requests are not received or where necessary resources are not reserved at the time of starting the image inputting process, the image processing process, and the image outputting process, the image inputting process, the image processing process, and the image outputting process are each performed independently in which one process is started after another process is completed.

(4) DETAILED EXAMPLE

FIGS. 8A and 8B are schematic diagrams for describing an operation of reserving resources in a case of scanning image data of a single page (a single sheet document) with the scanner 21 and printing (outputting) the image data of a single page with the plotter 26.

In this example, processes can be performed by dividing image data of a single page into smaller units and controlling the image data without requiring any intervals of times for transferring the image data.

As illustrated in FIG. 8A, in a case where an inputting process (in this example, obtaining image data by scanning a single sheet document by using an image input controller (e.g., scanner 21) of the engine control part 52), an image processing process (in this example, processing the obtained image data by using an image processor of the image processing part 53), and an image outputting process (in this example, printing the processed image data to a sheet of paper by using an image output controller (e.g., plotter 26)) are performed in parallel, resources including the scanner 21, the image processing part 53, the plotter 26, and the memory 23 (actually, image data space for allocating the image data from the image input controller and image data space for allocating the image data to be output to the image output controller) are reserved as a set when starting the image inputting process, the image processing process, and the image outputting process.

As illustrated in FIG. 8B, in a case of performing the image inputting process, the image processing process, and the image outputting process in parallel where already-input image data are used, resources including the HDD 24, the image processing part 53, the plotter 26, and the memory 23 (actually, image data space for allocating the image data from the HDD 24 and image data space for allocating the image data to be output to the image output controller) are reserved as a set when starting the image inputting process, the image processing process, and the image outputting process. That is, in a case where an inputting process (in this example, obtaining image data by reading image data of a single sheet document from the HDD 24 by using an HDD controller of the image processing part 53), an image processing process (in this example, processing the obtained image data by using an image processor of the image processing part 53), and an image outputting process (in this example, printing the processed image data to a sheet of paper by using an image output controller (e.g., plotter 26)) are performed in parallel, are reserved as a set when starting the image inputting process, the image processing process, and the image outputting process.

In the case of reading image data from the HDD 24, intervals of reading the image data may become longer because the performance of the HDD controller of the HDD 24 changes according to the load applied thereto. Therefore, the image processing process and the image outputting process may be performed after the reading of image data of a single sheet document is completed.

Figure 9:
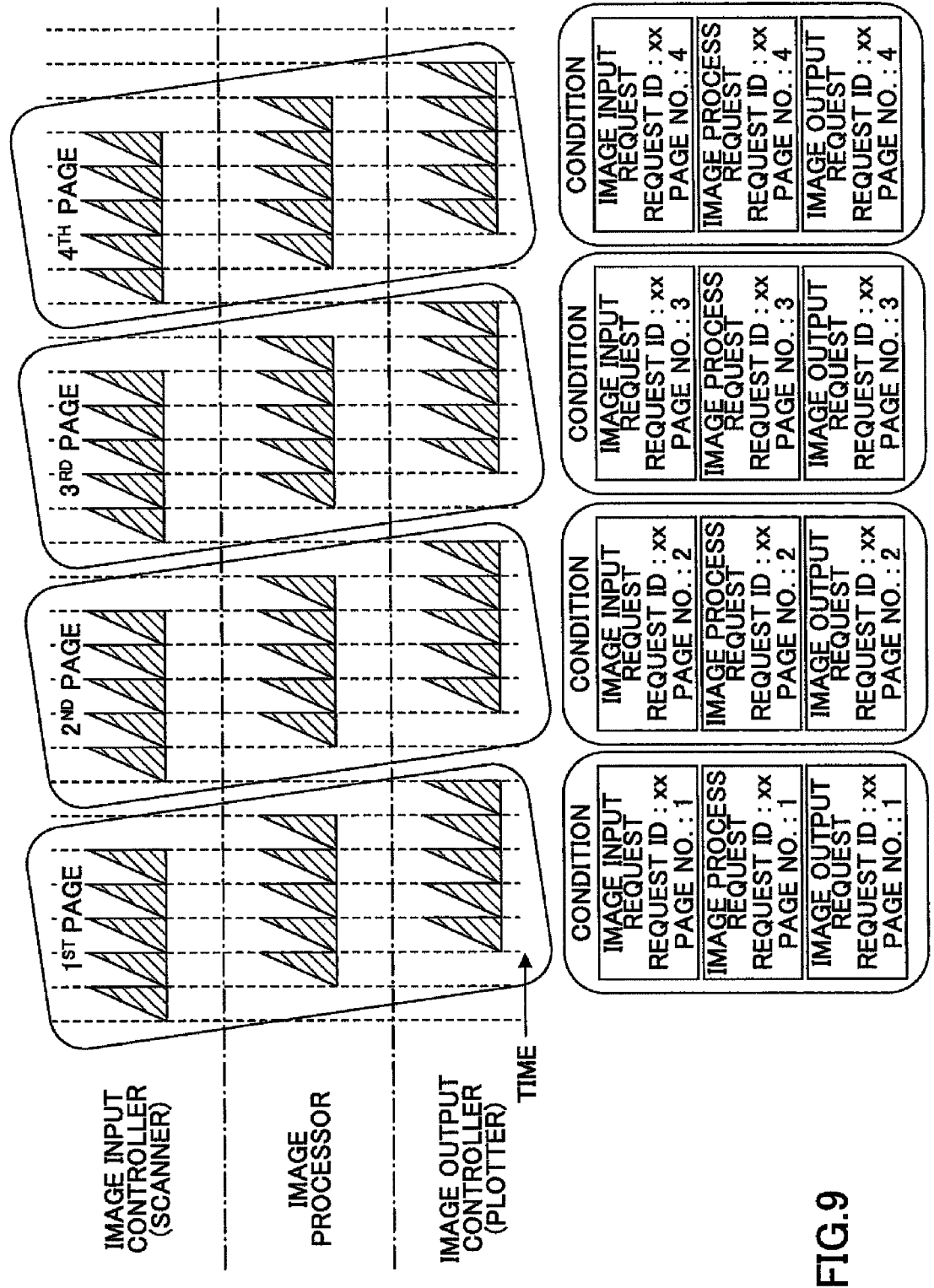
FIG. 9 is a schematic diagram illustrating obtained sets of resources and conditions set for each page in a case of consecutively inputting image data of plural pages from a scanner and outputting image data of plural pages from a plotter according to an embodiment of the present invention.

FIG. 9 is a schematic diagram illustrating obtained sets of resources and conditions (image IDs) set for each page in a case of consecutively inputting image data of plural pages from the scanner 21 and outputting image data of plural pages from the plotter 26 (i.e. performing a continuous copying process).

Figure 10:
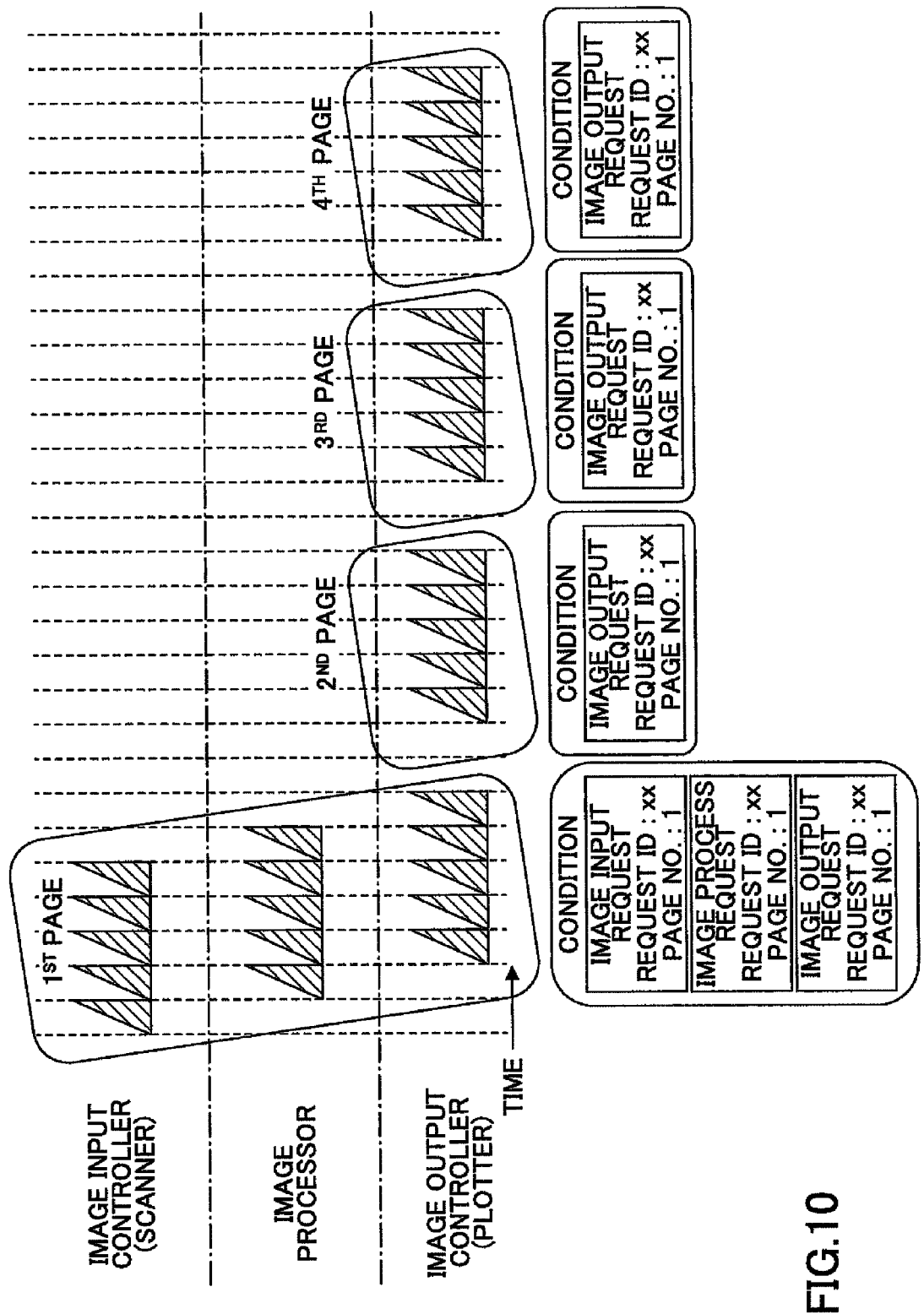
FIG. 10 is a schematic diagram illustrating obtained sets of resources and conditions set for each page in a case of inputting image data of a single page from a scanner and outputting image data of plural pages from a plotter according to an embodiment of the present invention.

FIG. 10 is a schematic diagram illustrating obtained sets of resources and conditions set for each page in a case of inputting image data of a single page from the scanner 21 and outputting image data of plural pages from the plotter 26. That is, in the case of FIG. 10, the scanner 21 obtains image data of a single page document and the plotter 26 repetitively prints (outputs) the obtained image data onto plural sheets of paper. In this case, the processes (i.e. image inputting process, image processing process, image outputting process) corresponding to the image input request, the image process request, the image output request do not necessarily have to be performed in parallel. For example, since the image inputting process by the scanner 21 is completed on or after the time of processing a second duplicate page (second page), only image outputting requests are issued and controlled as a set on or after the time of processing the second duplicate page (second page).

In a case where there is no input image data in the memory 23, image data may be read from the HDD 24 and allocated to the memory 23 by the image processing part 53.

[Processes by System Control Part]

Next, various processes performed by the system control part 51 according to an embodiment of the present invention are described with reference to FIGS. 11-15.

The system control part 51 selects one or more user services according to an instruction from a personal computer or a control panel of the MFP 100. Then, after the system control part 51 receives requests corresponding to the input providing function, the process providing function, and the output providing function of the application that provides the selected services, the system control part 51 performs the below-described processes.

Figure 11:
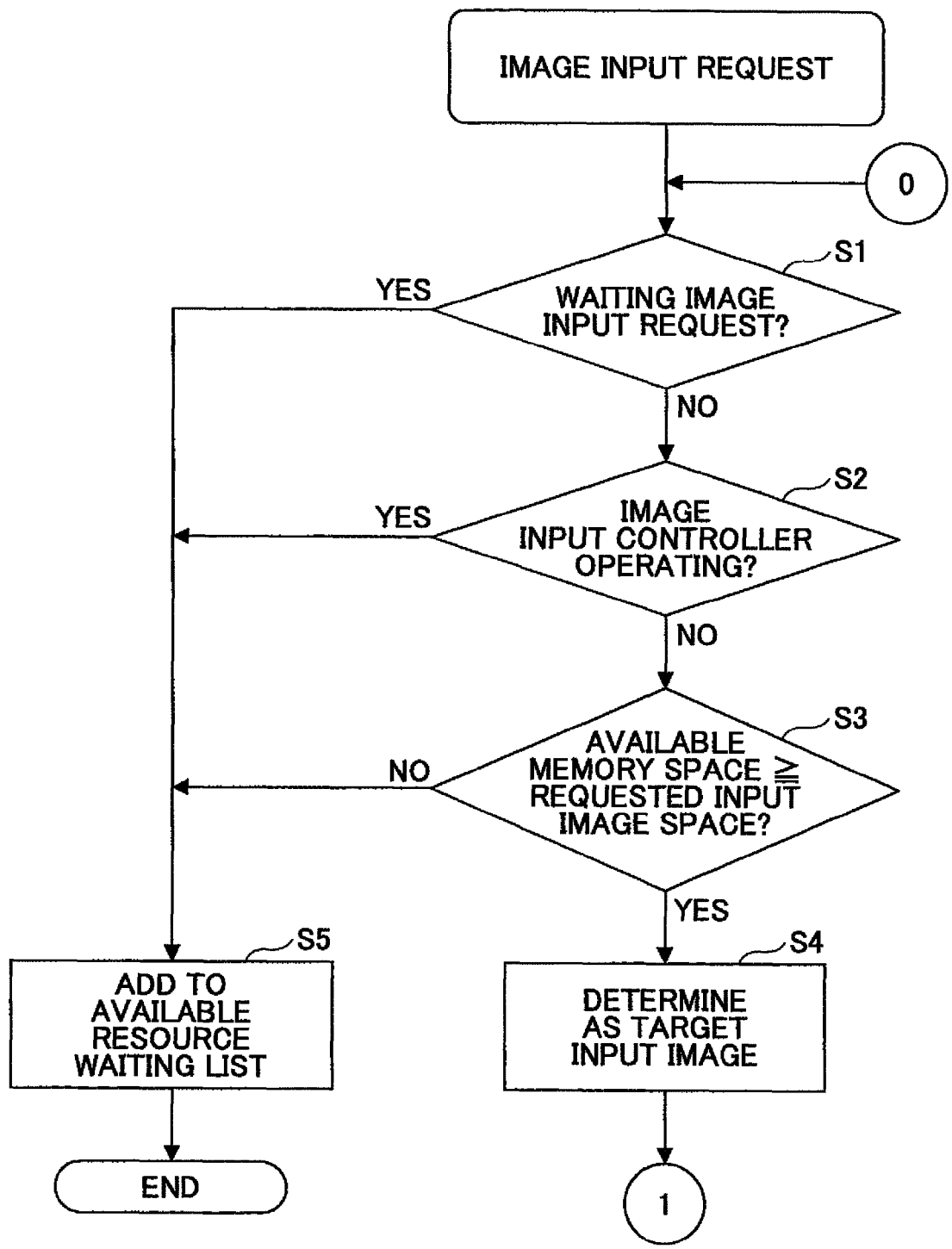
FIG. 11 is a flowchart illustrating an exemplary operation of a system control part in a case of performing an image inputting process according to an embodiment of the present invention.

FIG. 11 is a flowchart illustrating an exemplary operation of the system control part 51 in a case of performing an image inputting process.

The system control part 51 starts the operation of FIG. 11 upon receiving an image input request (request for executing a copier service) from the input providing function (in this example, reading providing function). First, the system control part 51 determines whether there is any image input request (in this example, a request for executing another user service such as a facsimile service) that is waiting (Step S1). In a case where there is a waiting image input request (Yes in Step S1), the operation proceeds to Step S5. In Step S5, the system control part 51 adds the received image input request to an available resource waiting list in the RAM. The operation of FIG. 11 is terminated after the received image input request is added to the available resource waiting list.

In a case where there is no image input request that is waiting (No in Step S1), the operation proceeds to Step S2. In Step S2, the system control part 51 determines whether an image input controller (in this example, the scanner 21) of the engine control part 52 is operating. In a case where the image input controller is operating, the operation proceeds to Step S5. In Step S5, the system control part 51 adds the received image input request to the available resource waiting list in the RAM. The operation of FIG. 11 is terminated after the received image input request is added to the available resource waiting list.

In a case where the image input controller is not operating (No in Step S2), the operation proceeds to Step S3. In Step S3, the system control part 51 determines whether available memory space can be reserved for storing data of the image input request (memory space to be used for image inputting) via the image processing part 53.

In a case of receiving a report from the image processing part 53 indicating that data cannot be input (memory unavailable report), the system control part 51 determines that the data cannot be reserved in the available space of the memory 23 (No in Step 33) and proceeds to Step S5. As described above, in Step S5, the system control part 51 adds the received image input request to the available resource waiting list in the RAM. The operation of FIG. 11 is terminated after the received image input request is added to the available resource waiting list.

In a case where the system control part 51 receives no memory unavailable report from the image processing part 53, the system control part 51 determines that the data can be reserved in the available space of the memory 23 (Yes in Step S3) and proceeds to Step S4. In Step S4, the system control part 51 determines that the image data to be input from the scanner 21 to the image processing part 53 via the engine control part 52 are target input image data. After determining the target input image data, the operation proceeds to a condition setting operation illustrated in FIG. 14.

Figure 12:
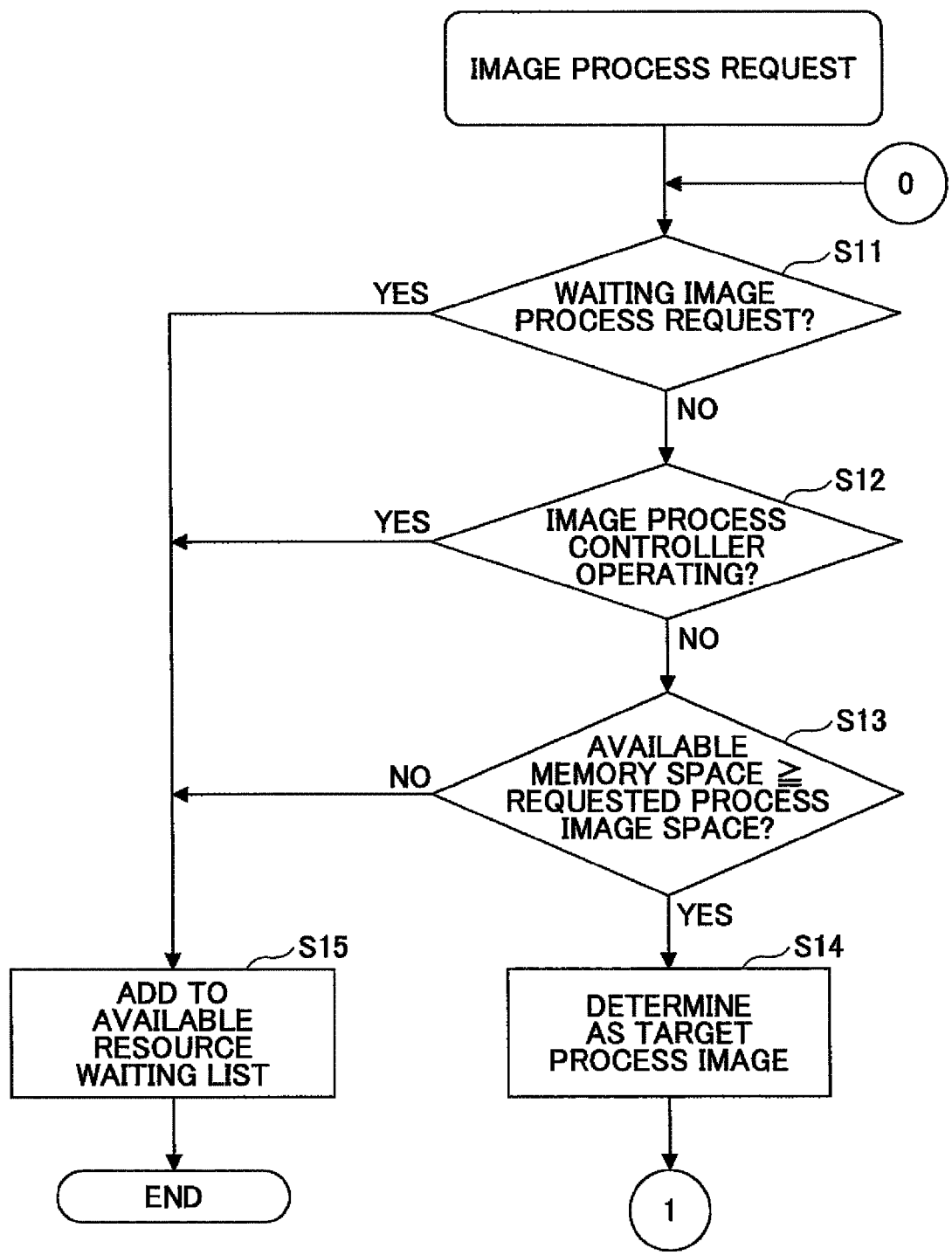
FIG. 12 is a flowchart illustrating an exemplary operation of a system control part in a case of performing an image processing process according to an embodiment of the present invention.

FIG. 12 is a flowchart illustrating an exemplary operation of the system control part 51 in a case of performing an image processing process.

The system control part 51 starts the operation of FIG. 12 upon receiving an image process request (request for executing a copier service) from the process providing function. First, the system control part 51 determines whether there is any image process request (in this example, a request for executing another user service such as a facsimile service) that is waiting (Step S1). In a case where there is a waiting image process request (Yes in Step S11), the operation proceeds to Step S15. In Step S15, the system control part 51 adds the received image process request to an available resource waiting list in the RAM. The operation of FIG. 12 is terminated after the received image process request is added to the available resource waiting list.

In a case where there is no image process request that is waiting (No in Step S11), the operation proceeds to Step S12. In Step S12, the system control part 51 determines whether an image processor (image process controller) of the image processing part 53 is operating. In a case where the image processor is operating, the operation proceeds to Step S15. In Step S15, the system control part 51 adds the received image process request to the available resource waiting list in the RAM. The operation of FIG. 12 is terminated after the received image process request is added to the available resource waiting list.

In a case where the image process controller is not operating (No in Step S12), the operation proceeds to Step S13. In Step S13, the system control part 51 determines whether available memory space can be reserved for storing data of the image process request (memory space to be used for image processing) via the image processing part 53.

In a case of receiving a report from the image processing part 53 indicating that data cannot be input (memory unavailable report), the system control part 51 determines that the data cannot be reserved in the available space of the memory 23 (No in Step S13) and proceeds to Step S15. As described above, in Step S15, the system control part 51 adds the received image process request to the available resource waiting list in the RAM. The operation of FIG. 12 is terminated after the received image process request is added to the available resource waiting list.

In a case where the system control part 51 receives no memory unavailable report from the image processing part 53, the system control part 51 determines that the data can be reserved in the available space of the memory 23 (Yes in Step S13) and proceeds to Step S14. In Step S14, the system control part 51 determines that the image data to be processed (subjected to image processing) by the image processing part 53 are target process image data. After determining the target input image data, the operation proceeds to a condition setting operation illustrated in FIG. 14.

Figure 13:
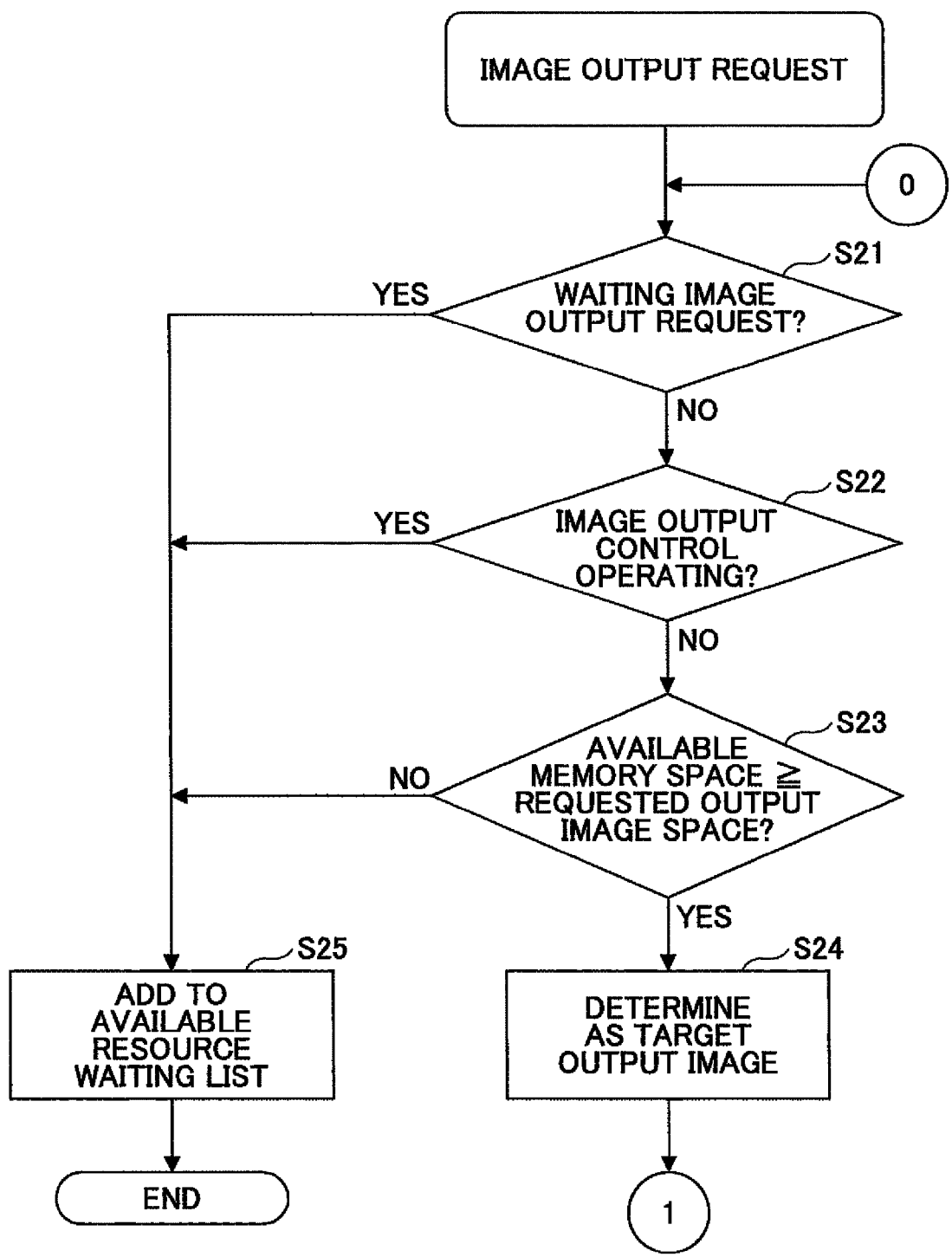
FIG. 13 is a flowchart illustrating an exemplary operation of a system control part in a case of performing an image outputting process according to an embodiment of the present invention.

FIG. 13 is a flowchart illustrating an exemplary operation of the system control part 51 in a case of performing an image outputting process.

The system control part 51 starts the operation of FIG. 13 upon receiving an image output request (request for executing a copier service) from the process providing function. First, the system control part 51 determines whether there is any image output request (in this example, a request for executing another user service such as a facsimile service) that is waiting (Step S21). In a case where there is a waiting image output request (Yes in Step S21), the operation proceeds to Step S25. In Step S25, the system control part 51 adds the received image output request to an available resource waiting list in the RAM. The operation of FIG. 13 is terminated after the received image output request is added to the available resource waiting list.

In a case where there is no image output request that is waiting (No in Step S21), the operation proceeds to Step S22. In Step S22, the system control part 51 determines whether an image output controller (in this example, plotter 26) of the engine control part 52 is operating. In a case where the image output controller is operating, the operation proceeds to Step S25. In Step S25, the system control part 51 adds the received image output request to the available resource waiting list in the RAM. The operation of FIG. 13 is terminated after the received image output request is added to the available resource waiting list.

In a case where the image output controller is not operating (No in Step S22), the operation proceeds to Step S23. In Step S23, the system control part 51 determines whether available memory space can be reserved for storing data of the image output request (memory space to be used for image outputting) via the image processing part 53.

In a case of receiving a report from the image processing part 53 indicating that data cannot be input (memory unavailable report), the system control part 51 determines that the data cannot be reserved in the available space of the memory 23 (No in Step S23) and proceeds to Step S25. As described above, in Step S25, the system control part 51 adds the received image output request to the available resource waiting list in the RAM. The operation of FIG. 13 is terminated after the received image output request is added to the available resource waiting list.

In a case where the system control part 51 receives no memory unavailable report from the image processing part 53, the system control part 51 determines that the data can be reserved in the available space of the memory 23 (Yes in Step S23) and proceeds to Step S24. In Step S24, the system control part 51 determines that the image data to be output from the image processing part 53 to the plotter 26 via the engine control part 52 are target output image data. After determining the target output image data, the operation proceeds to a condition setting operation illustrated in FIG. 14.

Figure 14:
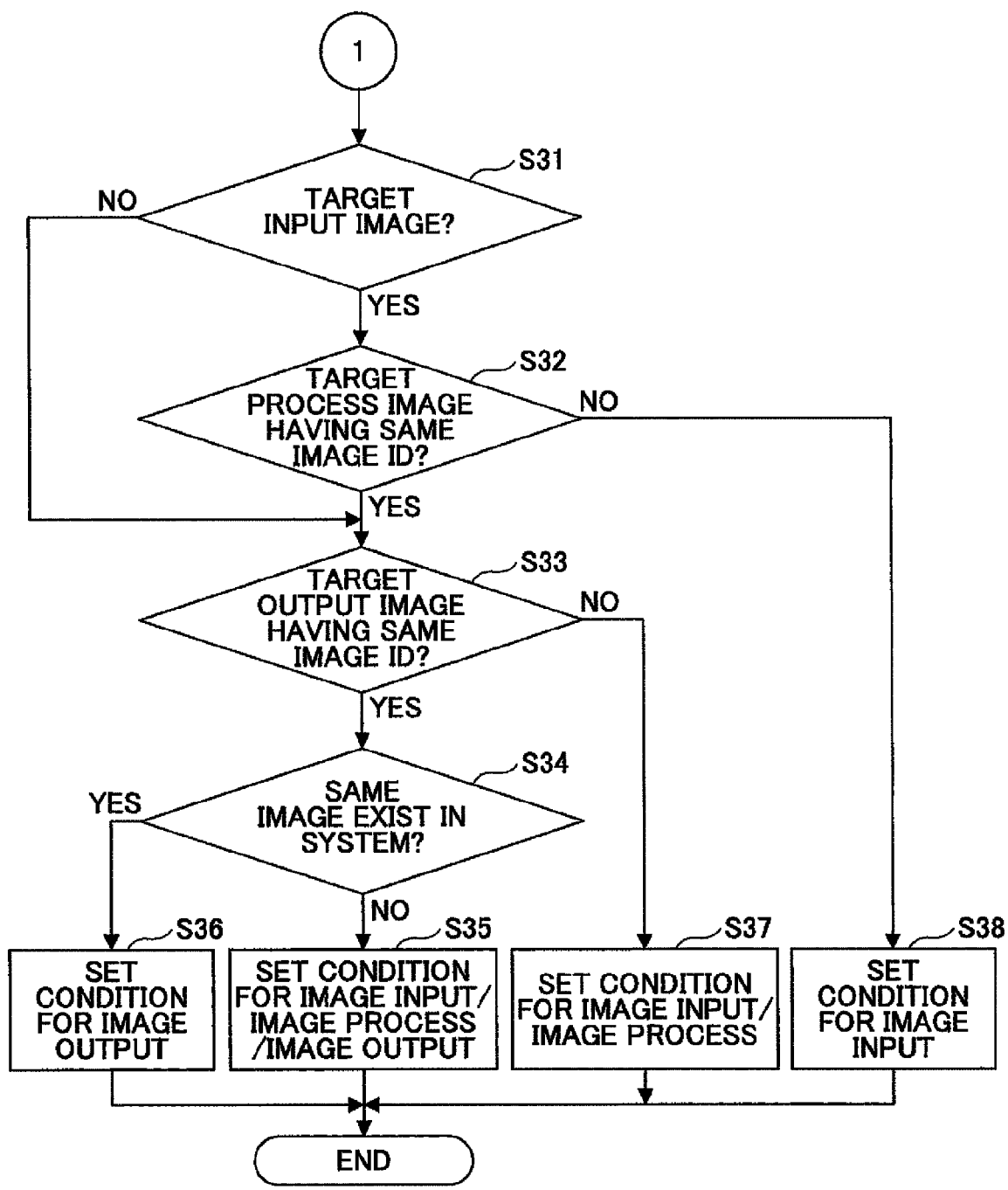
FIG. 14 is a flowchart illustrating an exemplary operation of a system control part in a case of performing a condition setting process according to an embodiment of the present invention.

FIG. 14 is a flowchart illustrating an exemplary operation of the system control part 51 in a case of performing a condition setting process.

The system control part 51 combines (relates) the image input request, the image process request, and the image output request that have the same image ID by referring to the target image data (target input image data, target process image data, target output image data) determined in corresponding Step S4 of FIG. 11, Step S14 of FIG. 12, and Step S24 of FIG. 13, sets (assigns) one or more of the requests to the engine control part (device driver) 52 and the image processing part 53, and instructs the engine control part 52 and the image processing part 53 to execute the process corresponding to the set (assigned) request.

In the operation of FIG. 14 the system control part 51 determines whether there are any target input image data (Step S31). In a case where there is no target input image data (No in Step S31), the operation proceeds to Step S33. In a case where there are target input image data (Yes in Step S32), the operation proceeds to Step S32. In Step S32, the system control part 51 determines whether there are any target process image data having the same image ID as the target input image data. In a case where there are the target process image data having the same image ID (Yes in Step S32), the operation proceeds to Step S33. In a case where there are no target process image data having the same image ID, the operation proceeds to Step S38.

In Step S38, the system control part 51 sets the image input request to the engine control part 52 and instructs the engine control part 52 to perform an image inputting process. The operation of FIG. 14 is terminated after instructing the image inputting process.

In Step S33, the system control part 51 determines whether there are any target output image data having the same image ID as the target process image data. In a case where there are the target output image data having the same image ID (Yes in Step S33), the operation proceeds to Step S34. In a case where there are no target output image data having the same image ID, the operation proceeds to Step S37.

In Step S37, the system control part 51 sets the image input request to the engine control part 52 and the image process request to the image processing part 53, and instructs the engine control part 52 to perform an image inputting process and the image processing part 53 to perform an image processing process. In this step, the system control part 51 combines (relates) the image input request and the image process request. Accordingly, each request of the combined requests is sequentially executed by the engine control part 52 and the image processing part 53. Thus, sequential control of the image inputting process and the image processing process can be achieved.

In Step S34, the system control part 51 determines whether image data being the same as the target output image data exists in the HDD 24. In a case where image data the same as the target output image data exists in the HDD 24 (Yes in Step S34), the operation proceeds to Step S36. In Step S36, the system control part 51 sets the image output request to the engine control part 52 and instructs the engine control part 52 to perform an image outputting process. The operation of FIG. 14 is terminated after instructing the image outputting process.

In a case where image data the same as the target output image data does not exist in the HOD 24 (No in Step S34), the operation proceeds to Step S35. In Step S35, the system control part 51 sets a printing request (image input request, image output request) to the engine control part 52 and an image process request to the image processing part 53, to thereby execute the image inputting process, the image processing process, and the image outputting process. In this step, the system control part 51 combines (relates) the image input request, the image process request, and the image output request. Accordingly, each request in the combined requests is sequentially executed by the engine control part 52 and the image processing part 53. Thus, sequential control of the image inputting process and the image processing process can be achieved.

Figure 15:
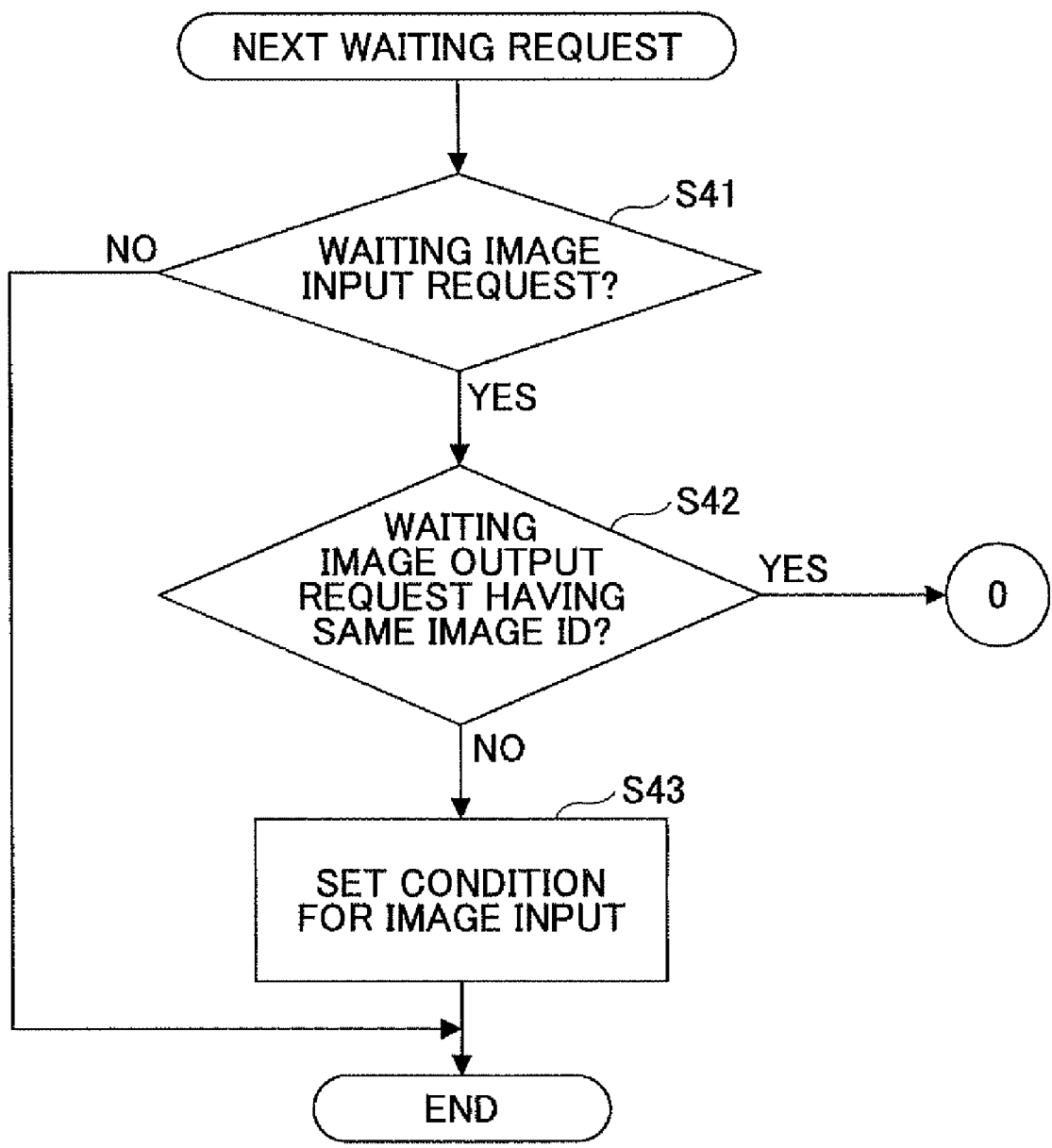
FIG. 15 is a flowchart illustrating an exemplary operation of a system control part in a case where there is a waiting request according to an embodiment of the present invention.

FIG. 15 is a flowchart illustrating an exemplary operation of the system control part 51 in a case where there is a waiting request (state of waiting for available resource).

After the system control part 51 instructs independent (separate) or sequential execution of the image inputting process, the image processing process, and the image outputting process by the engine control part 52 and the image processing part 53 as illustrated in FIG. 14, the system control part 51 performs the operation illustrated in FIG. 15. First, the system control part 51 refers to the available resource waiting list and determines whether there is any waiting image input request (image input request waiting to be executed). In a case where there is no waiting image input request (No in Step S41), the operation of FIG. 15 is terminated.

In a case where there is a waiting image input request (Yes in Step S41), the operation proceeds to Step S42. In Step S42, the system control part 51 refers to the available resource waiting list again and determines whether there is a waiting image output request having the same image ID as the waiting image input request. In a case where there is no image output request having the same image ID (No in Step S42), the operation proceeds to Step S43. In Step S43, the system control part 51 sets an image input request to the engine control part 52 and instructs the engine control part 52 to execute an image inputting process.

In a case where there is an image output request having the same image ID (Yes in Step S42), the operation proceeds to "0" of FIG. 11, that is, the operations of FIGS. 11-13 are performed. In other words, the system control part 51 may execute the image input request together with another image process request or an image output request in view of the available memory space (available resources) and determine conditions for executing the requests.

In a case where there is only a waiting image input request, only an image inputting process is executed. For example, in a case where there is an abnormality in the plotter 26 (e.g., paper jam), operations are performed in a condition where only the scanner 21 is operated. In another example, in a case of printing image data having the same image ID, operations are performed in a condition where only the plotter 26 is operated.

With the image processing apparatus 100 according to the above-described embodiment of the present invention, the image processing part 53 can be shared in a case of performing image processing on image data input from plural image input parts (e.g., scanner 21, network I/F 22, facsimile 25) and performing image processing on image data to be output to plural image output parts (e.g., plotter 26, network I/F 22, facsimile 25). Further, in a case where plural user services (e.g., copier service, facsimile service) that selectively use plural applications (software control parts) are selected, the image processing apparatus 100 sequentially receives plural image input requests, plural image process requests, and plural output requests from plural applications that provide services corresponding to the selected plural user services, and executes the plural image input requests, the plural image process requests, and the plural image output requests in an order in which the plural image input requests, plural image process requests, and plural output requests are sequentially received. Accordingly, in a case where the image processing apparatus 100 is to output image data from plural image output parts (e.g., plotter 26, network I/F 22, facsimile 25), the image processing apparatus 100 can share an image processing part 53 which performs an image processing process in correspondence with each of the plural image output parts. Thus, the image processing apparatus 100 can establish a controller platform that does not depend on the applications that provide the plural user services. Further, the image processing apparatus 100 can add/delete/change applications that provide the user services without having to change the image processing part 53.

The image processing apparatus 100 manages the memory 23, the HDD 24, the image processing part 53, plural image input parts (e.g., scanner 21, network I/F 22, facsimile 25), plural image output parts (e.g., plotter 26, network I/F 22, facsimile 25) as shared resources and arbitrates the shared resources when using the shared resources for plural applications. Accordingly, the image processing part 53 can be reliably shared with respect to plural user services.

Further, the image processing apparatus 100 can collectively set the conditions for controlling the image processing part 53 and the engine control part 52 when controlling the input/output of image data via the image processing part 53. Accordingly, the processes by the image processing part 53 and the engine control part 52 can be sequentially executed. Thus, throughput of the image processing apparatus 100 can be improved.

Further, by including the timing for starting the processes (operations) of the image processing part 53 and the engine control part 52 (conditions for sequentially controlling the image processing part 53 and the engine control part 52) in the conditions set to the image processing part 53 and the engine control part 52, differences due to mechanical layout of hardware (differences in the types of hardware) such as the scanner 21 and the plotter 26 can be absorbed.

Alternatively, the image processing apparatus 100 can separately set the conditions for controlling the image processing part 53 and the engine control part 52 when controlling the input/output of image data via the image processing part 53. Accordingly, the processes by the image processing part 53 and the engine control part 52 can be independently executed. This leads to improvement of image quality.

Further, the image processing apparatus 100 can combine separate requests issued to the image processing part 53 and the engine control part 52 from separate applications into a single set of requests (set of processes). Accordingly, an application for providing a user service can be added/deleted/changed with respect to any one of an image inputting process, an image processing process, and an image outputting process.

Further, with the image processing apparatus 100, because requests issued from each application to the image processing part 53 and the engine control part 52 can be queued as a single process, productivity dependent on the performance of the image processing part 53 can be achieved.

Further, because an image input part (e.g., scanner 21) and an image output part (e.g., plotter 26) can be designated from among the plural image input parts and image output parts of the image processing apparatus 100, the above-described advantages can be attained in a case where the image processing apparatus 100 performs, for example, a copying process.

The applications that provide the above-described user services may be installed in the MFP (image processing apparatus) 100 in the form of installable programs (applications) recorded on a recording medium (described in detail below). The recording medium on which the applications are recorded may be installed in the MFP 100 and have the application loaded to a storage part (HDD) 24 of the MFP. Accordingly, the application can be discretionally added in the storage part 24 of the MFP 100 even in a case where, for example, the MFP 100 is already shipped. Thus, various functions can be loaded to the MFP 100.

Further, the application stored in the storage part 24 may be uninstalled. Accordingly, storage space can be saved in the storage part 24 by deleting applications that have become unnecessary.

The recording medium used when installing the application may be distinguished (identified) so that the application can be uninstalled when the recording medium is the recording medium used for installing the application. Thereby, unauthorized uninstalling of the application can be prevented, and security for installed applications can be strengthened.

Further, the installing of the application can be performed at the time of initializing the MFP 100. Thereby, no special additional procedures are needed after the initialization of the MFP 100 is completed. Thus, various functions can be loaded to the MFP 100 more easily.

Although the above-described programs (applications) installed in the MFP 100 may be stored beforehand in the storage part 24 including, for example, a ROM, a non-volatile memory (e.g., flash ROM, EEPROM), or a HDD, the programs (applications) may be recorded in non-volatile recording media (memories) including, for example, CD-ROM, a memory card, a flexible disk, an MO, CD-R, CD-RW, DVD+R, DVD+RW, DVD-R, DVD-RW, or DVD-RAM. Accordingly, the programs (applications) recorded in the recording media may be loaded to the storage part 24 and executed by the CPU 27 or read out from the recording media and executed by the CPU 27.

Further, the MFP 100 may be connected to a network, so that the MFP 100 can download programs (applications) from an external device installed with a recording medium on which the programs (applications) are recorded or from an external device having a storage part with the programs (applications) stored therein.

In the foregoing description, although the embodiment of the present invention is applied to an MFP, the embodiment of the present invention may be applied to an image forming apparatus such as a digital copier, a facsimile, a printer that either has plural image output parts or is connectable to plural image output parts. Further, the embodiment of the present invention may also be applied to an image reading apparatus or other image processing apparatuses (e.g., PC) that either has plural image output parts or is connectable to plural image output parts.

The present invention is not limited to the specifically disclosed embodiments, and variations and modifications may be made without departing from the scope of the present invention.

The present application is based on Japanese Priority Application No. 2008-182906 filed on Jul. 14, 2008, the entire contents of which are hereby incorporated herein by reference.

What is claimed is:
1. An image processing apparatus comprising:
a plurality of image outputting parts;
an image processing part configured to process image data to be output by the plural image outputting parts;

a plurality of software control parts configured to selectively control the plural image outputting parts and issue a plurality of image process requests and a plurality of image output requests;

a user service selecting part configured to share the image processing part in a case of processing the image data to be output from the plural image outputting parts and select a plurality of user services that selectively use the plural software control parts; and a request executing part configured to sequentially receive the plural image process requests and the plural image output requests issued by the plural software control parts and execute the plural image process requests and the plural image output requests in an order in which the plural image process requests and the plural image output requests are sequentially received from the plural software control parts;

wherein the plural software control parts are configured to combine the plural image process requests and the plural image output requests in a case where the same image ID is assigned to the plural image process requests and the plural image output requests.

2. The image processing apparatus as claimed in claim 1, further comprising:

a plurality of image inputting parts;

wherein the image processing part is further configured to process image data input from the plural image inputting parts;

wherein the plural software control parts are further configured to selectively control the plural image inputting parts;

wherein the user service selecting part is further configured to share the image processing part in a case of processing the image data input from the plural image inputting parts and the image data to be output from the plural image outputting parts; and wherein the request executing part is further configured to sequentially receive a plurality of image input requests from the plural software control parts and execute the plural image input requests, the plural image process requests, and the plural image output requests in an order in which the plural image input requests, the plural image process requests, and the plural output requests are sequentially received.

3. The image processing apparatus as claimed in claim 2, further comprising:

an image storage part configured to store image data;

an image transfer control part configured to transfer image data between the image storage part, the image processing part, the plural image inputting parts, and the plural image outputting parts;

an image input/output control part configured to control input of image data to the image storage part and control output of image data from the image storage part;

an arbitrating part configured to manage the image storage part, the image processing part, the plural image input parts, the plural image output parts, and the image transfer control part as sharable resources and arbitrate the sharable resources when using the sharable resources for the plural software control parts at the same time or when using the same sharable resources for the plural software control parts.

4. The image processing apparatus as claimed in claim 3, further comprising:

a condition setting part configured to set conditions applied to the image processing part and the image transfer control part in a case where the image input/output control part controls the input of image data to the image storage part and the output of image data from the image storage part.

5. The image processing apparatus as claimed in claim 4, wherein the conditions include the timing for each of the image processing part and the image transfer control part to start operating.

6. The image processing apparatus as claimed in claim 4, wherein one of the plural image input parts includes a scanner that scans image data from a document.

7. The image processing apparatus as claimed in claim 4, wherein one of the plural image output parts includes a plotter that prints image data onto a printing medium.

8. The image processing apparatus as claimed in claim 1, wherein in a case where the same image ID is not assigned to the plural image process requests and the plural image output requests, the request executing part is configured to execute the plural image process requests and the plural image output requests separately.

9. The image processing apparatus as claimed in claim 2, wherein the plural software control parts are configured to combine the plural image process requests, the plural image output requests, and the plural image input requests in a case where the same image ID is assigned to the plural image process requests, the plural image output requests, and the plural image input requests.

* * * * *